United States Patent [19]
Coellner et al.

[11] Patent Number: 5,733,451
[45] Date of Patent: Mar. 31, 1998

[54] CORE FOR INTERACTING WITH A FLUID MEDIA FLOWING THERETHROUGH AND METHOD OF MAKING THE SAME

[75] Inventors: James A. Coellner; Henry Mark, both of Philadelphia, Pa.

[73] Assignee: Englehard/ICC, Hatboro, Pa.

[21] Appl. No.: 712,236

[22] Filed: Sep. 11, 1996

Related U.S. Application Data

[63] Continuation of Ser. No. 246,548, May 20, 1994, abandoned.

[51] Int. Cl.⁶ .................................................. B01D 53/06
[52] U.S. Cl. ..................... 210/496; 210/502.1; 96/125; 96/126
[58] Field of Search ......................... 210/502.1, 496, 210/510.1; 96/125, 126; 423/326

[56] References Cited

U.S. PATENT DOCUMENTS

| | | | |
|---|---|---|---|
| 3,871,852 | 3/1975 | Pei | 65/4 |
| 3,923,940 | 12/1975 | Hujii et al. | |
| 3,965,695 | 6/1976 | Rush et al. | |
| 4,093,435 | 6/1978 | Marron et al. | 55/269 |
| 4,134,743 | 1/1979 | Macriss et al. | |
| 4,228,847 | 10/1980 | Lindahl | 165/10 |
| 4,255,171 | 3/1981 | Dravnieks | 55/269 |
| 4,594,860 | 6/1986 | Coellner et al. | 62/271 |
| 4,810,685 | 3/1989 | Twigg et al. | 502/60 |
| 4,853,202 | 8/1989 | Kuznicki | 423/326 |
| 5,148,374 | 9/1992 | Coellner | 364/505 |
| 5,230,466 | 7/1993 | Moriya et al. | 236/44 A |
| 5,326,633 | 7/1994 | Clough et al. | 428/288 |

OTHER PUBLICATIONS

Fundamentals of Heat and Mass Transfer, Third Edition, Frank P. Incopera and David P. DeWitt, pp. 353–356, 1990.
Advertisement "The Simple Solution to Supermarket Humidity Problems", Cargocaire Engineering Corp., 1988.
Kays, W.M.; London, A.L. *Compact Heat Exchangers*. 3rd ed. McGraw–Hill Book Company. 1984. pp. 186–188, 279.

Primary Examiner—David A. Reifsnyder
Attorney, Agent, or Firm—Panitch Schwarze Jacobs & Nadel, P.C.

[57] ABSTRACT

A core for interacting with a fluid media flowing therethrough which includes a plurality of adjoining channels. Each of the channels is generally in the form of a hexagon in cross section and includes an internal surface area. The internal surface area is coated with an interactive material which interacts with the fluid media flowing through the channels to achieve one of heat transfer, mass transfer, catalysis, ion exchange, separation of the fluid media, removal of organic compounds from the fluid media, dilution or concentration of fluid components, treatment of fluid-carried organisms, and the capture and retention of hazardous materials. Examples of the use of the core include positioning the core within a rotary heat exchanger wheel or a rotary mass-transfer wheel, often used in desiccant air-conditioning systems.

13 Claims, 3 Drawing Sheets

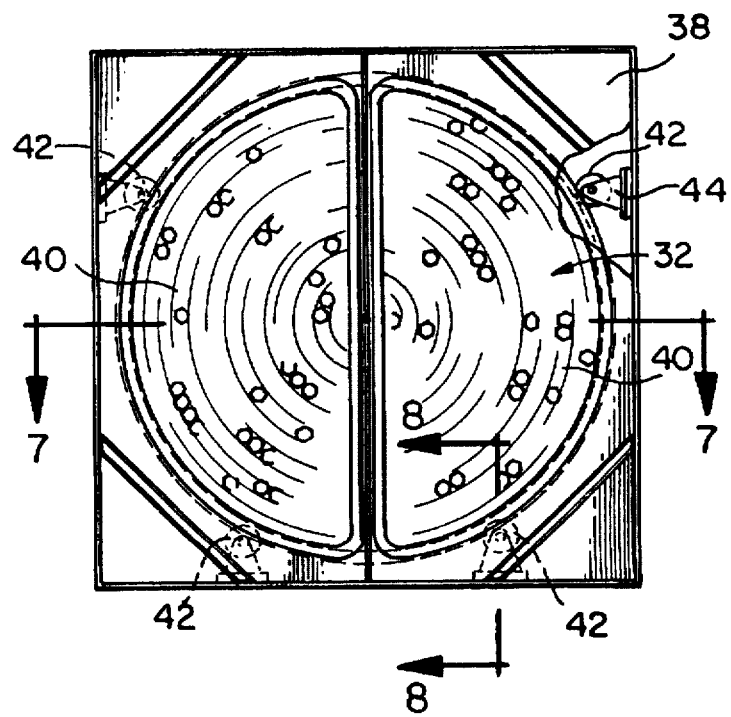
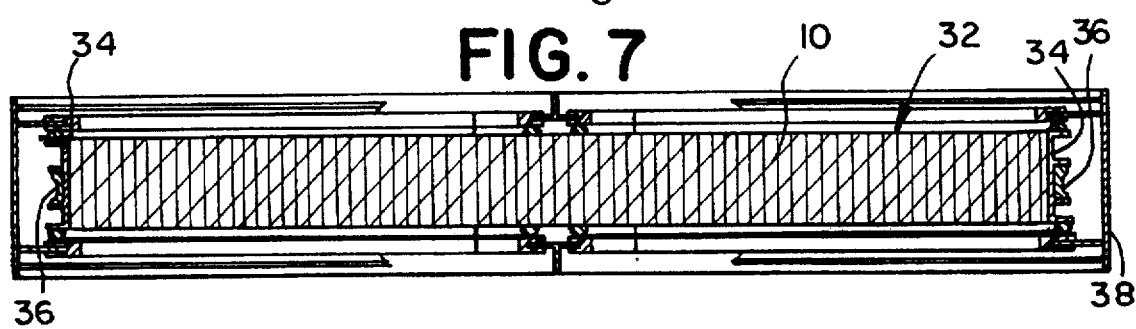
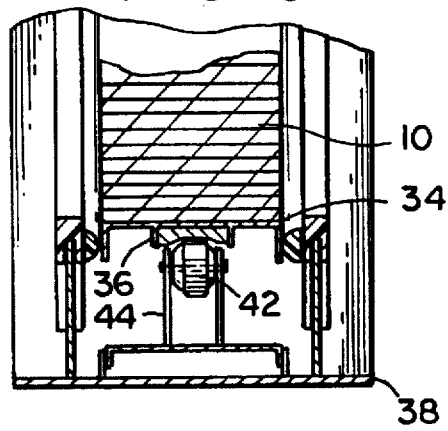

CORE FOR INTERACTING WITH A FLUID MEDIA FLOWING THERETHROUGH AND METHOD OF MAKING THE SAME

This is a Continuation of application Ser. No. 08/246,548, filed May 20, 1994, now abandoned.

FIELD OF THE INVENTION

The present invention relates to a core for interacting with a fluid media flowing therethrough and, more particularly, to a mass or heat exchanger wheel having a core for exchanging one of heat and mass with a fluid media flowing therethrough.

BACKGROUND OF THE INVENTION

Regenerative type periodic flow devices are conventionally employed for the transfer of heat or of other constituents from one fluid stream to another, and thereby from one area or zone in space to another. Typically, a sorptive mass is used to collect heat or a particular mass component from one fluid stream which flows over or through the sorptive mass. The flowing fluid is rendered either cooler (in the case of heat sorption) or less concentrated (in the case of, for instance, adsorption of particular gases). The sorptive mass is then taken "off-stream" and regenerated by exposure to a second fluid stream which is capable of accepting the heat or material desorbed with favorable energetics.

In many instances, the sorptive material is contained within a vessel or distributed within a bed structure. It is desirable that such material be provided with maximum surface area, and that fluid flows through the sorptive material matrix in a smooth (non-turbulent) and regular state. Once the sorptive material has been saturated (i.e., has reached its maximum designed capacity for sorption), the vessel or bed is then removed from the fluid flow path and exposed to a second fluid flow to regenerate the sorptive capacity of the material by, for instance, cooling the sorptive material or desorbing material taken up during "on-stream" operation. After such regeneration, the sorptive material is once more placed back "on-stream" and the operation continues.

From such single cycle systems evolved multiple vessel systems which permitted semi-continuous (or semi-batch) operation by synchronously alternating two or more sorptive vessels between on-stream and off-stream operation. The choice of numbers of vessels and cycle structures depends on many factors, but most importantly the ratio between consumption rate of the sorptive capacity of the vessel, and regeneration rates for that same vessel.

In some applications, semi-continuous systems have evolved into continuous flow systems where the sorptive media itself is moved between two or more flowing fluid streams. The most common construction employed for such systems is a porous disk, often referred to as a wheel or rotor. In its simplest form, such a wheel is divided into two flow zones, and fluid is passed over the sorptive surface of the wheel (typically flowing through the thickness of the disc parallel to the rotational axis of the cylinder) as the wheel is rotated to carry the sorptive material from one zone, into the other, and back again to complete a revolution. In a heat exchanger wheel, for instance, one zone of warm fluid and one zone of cooler fluid are present. Heat is adsorbed by the material of the wheel in the warm flow zone, and is carried away from the wheel as the sorptive material passes through the cool flow zone. U.S. Pat. No. 4,594,860 discloses such a continuous flow system and is hereby incorporated by reference.

Wheels or rotors of the type described above are normally manufactured by assembling and uniting, usually by gluing, alternate flat and corrugated layers. The assembled flat layer and sinusoidal layer are then wound or coiled to form a rotor or similar core of essentially cylindrical form. The flat and sinusoidal layers can be comprised of a composite material wherein one of the constituents is a sorbent or reactive material or the sorbent or reactive material could be coated onto the layers either before or after forming. The height of such corrugated geometries is usually in the range of 0.050 to 0.120 inches, the length-to-diameter ratio is typically in the range of 125 to 200 and the thickness of the layers is in the range of 0.0005 to 0.2000 inches.

Conventionally, the preferred geometrical configuration of the core channels has been the corrugated or sinusoidal type described above. However, it has been known to provide or at least attempt to provide the core section with other cross-sectional configurations for the channels, including square, as shown in FIG. 1, triangular, as shown in FIG. 2, and circular, as shown in FIG. 3.

It is generally known that sorbent mass transfer is analogous to heat transfer. This relationship is defined in U.S. Pat. No. 5,148,374, which is hereby incorporated by reference, as the number of transfer units which corresponds to the effectiveness of the heat transfer. The greater the number of transfer units, the more effective the heat transfer. The number of transfer units is dependent on, among other things, the available transfer surface area.

When conventional extended surfaces, such as those shown in FIGS. 1 through 3, are coated with materials for either sorption or reactive processes with fluid mixtures, there can be significant changes in the geometries brought about by the nature of the coating process. When the material is applied by deposition from a carrier fluid passed through the extended surface substrate, there tends to be a buildup of the fluid at the corner of the cells, especially in geometries with sinusoid-like corners. The principle driving force for this phenomenon is surface tension when a non-flooding technique is employed (i.e., the cells are not completely filled with the fluid). Under a flooded condition, such as is brought about by forced flow, the buildup is governed by the growth of a boundary layer in the corner regions. More particularly, in laminar flow in tubes, boundary layers will cling to passage walls, while the bulk of the fluid flow will be through the center of the passage at high velocities. As the slow-moving boundary layers extend from the passage walls with increasing flow velocity, the layers will join at corners produced at flat wall surface junctures. This joining results in rounded corners, producing a section approximating a circle.

Referring now to FIG. 1, there is shown a first conventional core 10a for interacting with a fluid media (not shown) flowing therethrough. The first core 10a includes a plurality of closely nested adjoining channels 12a which are generally in the form of a square in cross section. The internal surface area of the channels 12a is coated with a sorbent or reactive material 14a.

In core structures with surface angles approaching 90°, such as in a square, the corner buildup of the sorbent or reactive material 14a during the coating process provides two significantly degrading effects: (1) the sorbent or reactive material 14a is concentrated in the corner region which results in the use of an excessive amount of sorbent or reactive material in the corners and an increase in pressure drop through the core because of the smaller cross-sectional area of the channels through which the fluid media must pass, and (2) the available transfer surface area initially available prior to coating is significantly reduced. This extra buildup of sorbent or reactive material 14a and the corresponding reduction in available transfer surface results in a reduction of the number of transfer units. Further, the increase in the pressure drop through the first core 10a raises the cost of forcing the fluid media thorough the first core 10a, thereby decreasing the energy efficiency of any system employing the first core 10a.

There is shown in FIG. 2 a second conventional core 10b having a plurality of closely nested adjoining channels 12b which are generally in cross section. The triangular channels 12b of the second core 10b also result in the sorbent or reactive material 14b up in the corners of the triangles and the associated problems set forth above in the discussion of FIG. 1. Further, the associated problems are even greater with the use of a corrugated or sinusoidal surface because of the greater acuteness of the angles created. That is, even where triangular channels are formed from a corrugated process, the triangular channels never form true sharp corners resulting in the tangential element of a sinusoid always being present.

Referring now to FIG. 3, while the use of sinusoidal, square or triangular geometries results in problems of corner buildup, the use of a circular geometry avoids the problem of corner buildup, since a circle, by definition, does not include a corner. The third conventional core 10c includes a plurality of adjoining channels 12c which are generally circular in cross section. While the sorbent or reactive material 14c is applied uniformly to the internal surface of the channels 12c, there are voids between the channels 12c which become filled with the sorbent or reactive material 14c to thereby create dead areas 16c in the cross-sectional configuration of the third core 10c. While in theory a circular configuration results in a relatively larger transfer surface and the best number of transfer units and the smallest relative pressure drop through the core 10c, there has been no practical method of manufacturing a core with generally circular channels in which the wall thickness and channel size are sufficiently small to accomplish the number of transfer units achieved by the core discussed above.

In view of the foregoing problems with conventional geometries for heat or mass transfer of fluid passing through an extended surface core, a need has arisen for a geometry which will balance the problems of uniformly coating the sorbent or reactive material to achieve the greatest transfer surface and decreasing the pressure drop across the core to reduce the cost of the power necessary to force the fluid through the core.

The present invention solves these needs by providing a core which includes a plurality of closely nested channels which are generally in the form of a hexagon in cross section. Use of the present invention results in a cost-efficient core which effectively balances the number of transfer units and the pressure drop across the core.

SUMMARY OF THE INVENTION

Briefly stated, the present invention is directed to a core for interacting with a fluid media flowing therethrough comprising a plurality of adjoining channels. Each of the channels is generally in the form of a hexagon in cross section, and includes an internal surface area. The internal surface area is coated with an interactive material which interacts with the fluid media flowing through the channels.

In another aspect of the present invention, the core is for use in mass or heat exchangers, and the internal surface area is coated with an exchange material which exchanges one of heat and mass with a fluid media flowing through the channels.

Another aspect of the present invention is a method of making a core for interacting with fluid media flowing therethrough by forming a plurality of adjoining channels which are generally in the form of a hexagon in cross section. Each of the channels has a centrally disposed longitudinal axis. A coating of an interactive material is applied to an internal surface area of the channels which interacts with fluid media flowing through the channels.

Another aspect of the present invention is a rotary wheel for use in mass or heat exchangers. The wheel includes a core in the form of a wheel of a predetermined diameter, circumference and width. The core includes a plurality of adjoining channels. Each of the channels is generally in the form of a hexagon in cross section and includes an internal surface area. The internal surface area is coated with an exchange material which exchanges heat or mass with the fluid media flowing through the channels. A semi-rigid rim is secured about the circumference of the core.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 6 is a front elevational view of a rotary heat exchanger and/or mass transfer wheel rotatably supported within a housing in accordance with a second preferred embodiment of the present invention;

FIG. 7 is a greatly enlarged cross-sectional view of the rotary wheel shown in FIG. 6 taken along lines 7—7 of FIG. 6; and FIG. 8 is a greatly enlarged cross-sectional view of the wheel and housing shown in FIG. 6 taken along lines 8—8 of FIG. 6.

DETAILED DESCRIPTION OF THE PREFERRED EMBODIMENTS

Figure 1:
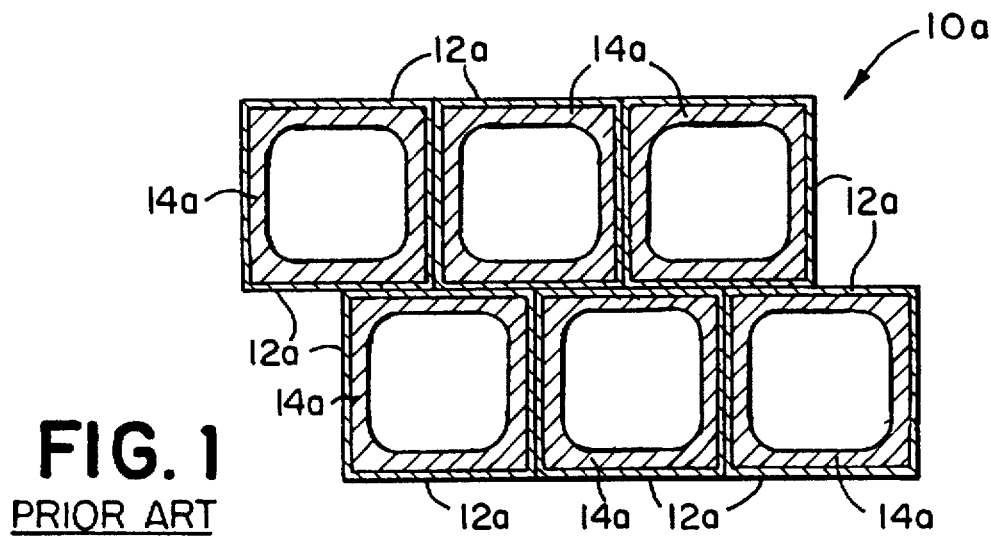
FIG. 1 is a cross-sectional view of a portion of a first core in accordance with the prior art.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the core and designated parts thereof. The terminology includes the words above specifically mentioned, derivatives thereof and words of similar import.

Figure 5:
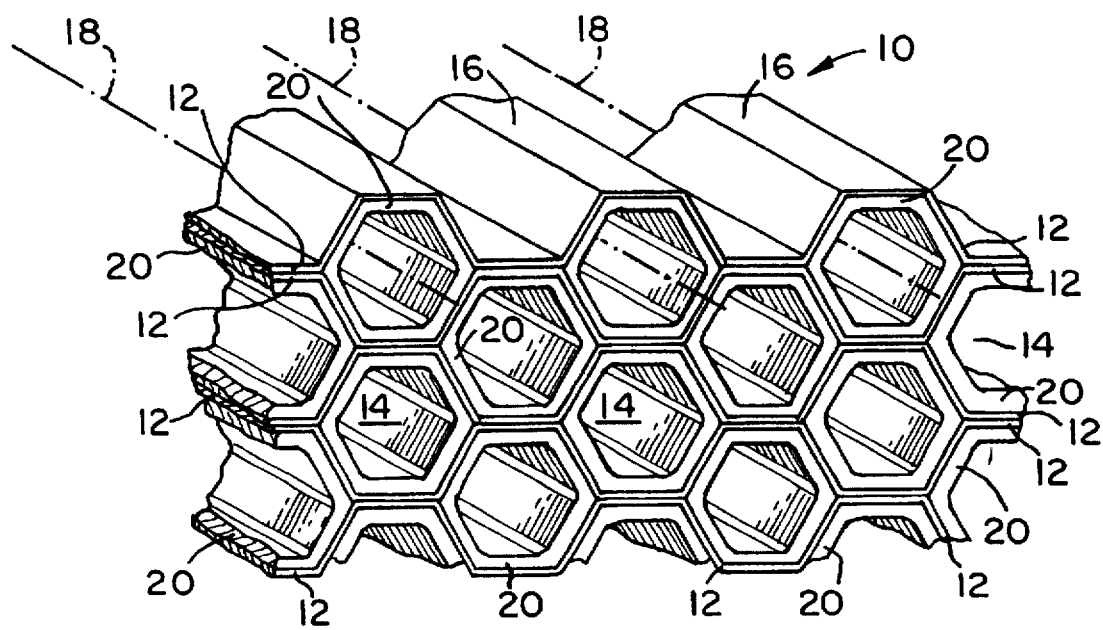
FIG. 5 is a front perspective view of a portion of the core of the wheel shown in FIG. 4.
Figure 4:
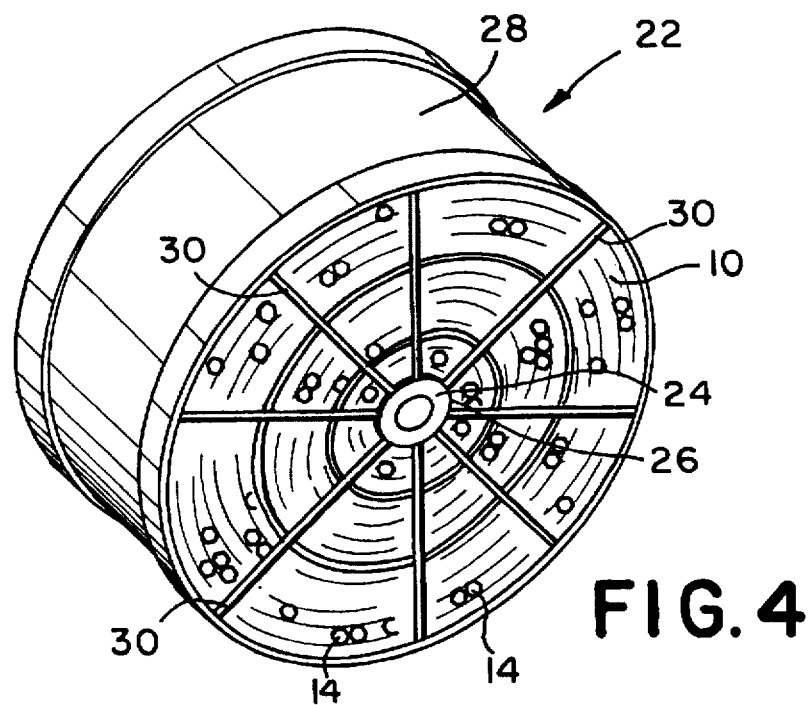
FIG. 4 is a perspective view of a rotary heat exchanger and/or mass transfer wheel in accordance with a first preferred embodiment of the present invention.

Referring now to the drawings in detail, wherein like numerals are used to indicate like elements throughout, there is shown in FIGS. 4 and 5 a first preferred embodiment of a core, generally designated 10, for interacting with a fluid media (not shown) flowing therethrough in accordance with the present invention. The term "fluid media" as used herein applies equally to both compressible and incompressible fluids, such as gases, liquids and fluids in the gaseous/liquid phase, such as vapor. As best shown in FIG. 5, the core 10 is comprised of a plurality of adjoining channels 14. Each of the channels 14 is generally in the form of a hexagon in cross section and includes an internal surface area 16.

In the first preferred embodiment, it is preferred that the channels 14 be formed from a plurality of stacked layers of material 12. The layers of material 12 of said channels 14 have a minimum thickness to inhibit the effect of the wall thickness increasing the pressure drop through the core 10 and yet provide the core 10 with sufficient structural integrity to be self supporting. In the first preferred embodiment, it is preferred that the layers of material have a thickness of about 0.0015 inches. With respect to FIG. 4, this results in the angled walls having a thickness of about 0.0015 inches and the horizontal or double-layered walls having a thickness of about 0.003 inches. It is understood by those skilled in the art that the exact thickness of the walls formed by the layers of material 12 could vary, depending upon the particular application of the core 10 and existing manufacturing techniques, without departing from the spirit and scope of the invention. For instance, the thickness of the walls formed by the layers of material 12 could be in the range of about 0.001 to 0.006 inches.

Each of the channels 14 includes a centrally disposed longitudinal axis 18. The channels 14 are preferably sized such that a distance between and along longitudinal axes of adjacent channels is generally uniform (i.e., the adjacent channels 14 are equidistantly spaced from each other and extend generally parallel with respect to each other). In the first preferred embodiment, it is preferred that the distance between the longitudinal axes 18 be in the range of about 0.050 to 0.125 inches. Thus, the channels 14 of the present invention, due to their hexagonal cross-sectional configuration, are closely adjoined to increase the available transfer surface per unit of volume.

In the present embodiment, it is preferred that the layers of material 12 be comprised of a non-metallic, high-strength, temperature-resistant, low thermal conductivity material, such as Nomex® aramid in paper form. The process of assembling the layers of material 12 in the form of the channels 14 is well understood by those skilled in the art. An example of a commercially available product which meets the criteria of the present invention is Aeroweb® HMX-20 without the resilient resin coating, manufactured by Ciba Composites of Anaheim, Calif., a division of Ciba Geigy Corporation of Ardsley, N.Y. However, it is understood by those skilled in the art that the layers of material 12 and the manner in which they are formed are not pertinent to the present invention, and that other materials, such as craft paper, nylon fiber paper, mineral fiber paper and the like could be used to construct the layers of material 12 and that other methods could be used to form the hexagonal channels 14, such as extrusion, machining or molding, without departing from the spirit and scope of the invention.

In the first preferred embodiment, the internal surface area 16 is preferably coated with an interactive material 20 which interacts with the fluid media flowing through the channels 14 to achieve one of heat transfer, mass transfer, catalysis, ion exchanged separation of the fluid media, removal of organic compounds (e.g., volatile organic compounds) from the fluid media, dilution or concentration of fluid components, treatment of fluid-carried organisms, and the capture and retention of hazardous materials. In the first preferred embodiment, it is preferred that the core 10 be used in connection with mass or heat exchangers and that the interactive material 20 be an exchange or sorbent material which exchanges or sorbs one of heat and mass with the fluid media flowing through the channels. That is, it is preferred that the exchange or sorbent material be capable of removing mass or transferring heat from the fluid media flowing through the channels 14 and be capable of transferring mass or heat to the fluid media flowing through the channels 14. As used herein, the terms sorb and sorptive mean adsorption and/or absorption. In the first preferred embodiment, it is preferred that the exchange or sorbent material be a desiccant material, such as a crystalline titanium silicate molecular sieve zeolite compound manufactured by Englehard Corporation of Edison, N.J. under the trade name ETS and disclosed in U.S. Pat. No. 4,853,202, which is hereby incorporated by reference.

It is understood by those skilled in the art from this disclosure that other desiccant materials could be used, such as lithium chloride, silica gel, molecular sieve materials such as natural and synthetic zeolites and chemical sorbents such as activated carbon and the like, without departing from the spirit and scope of the invention. It is also understood by those skilled in the art from this disclosure that the present invention is not limited to the application of any particular interactive material to the internal surface area 16 of the channels 14. For instance, the internal surface area 16 could be coated with other materials to achieve catalysis, ion exchange, removal of organic compounds (e.g., volatile organic compounds) from the fluid media, dilution or concentration of fluid components, treatment of fluid-carried organisms, and the capture and retention of hazardous materials. Further, where the fluid media is comprised of two or more elements, the exchange or sorbent material could sorb one of the elements from the fluid media to separate the fluid media into constituent components.

Figure 2:
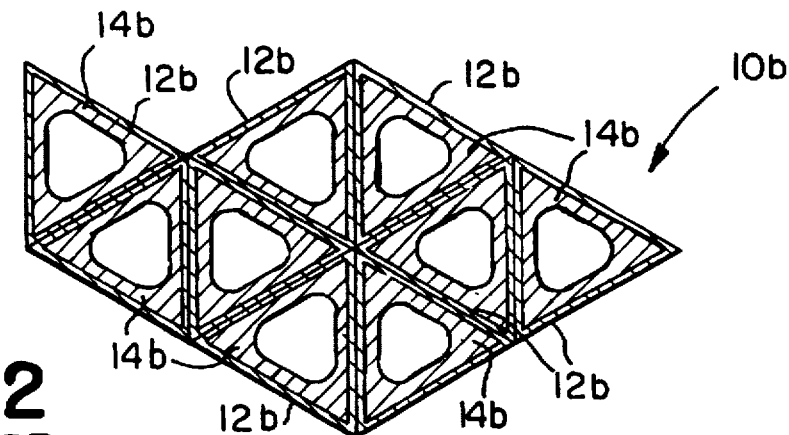
FIG. 2 is a cross-sectional view of a portion of a second core in accordance with the prior art.
Figure 3:
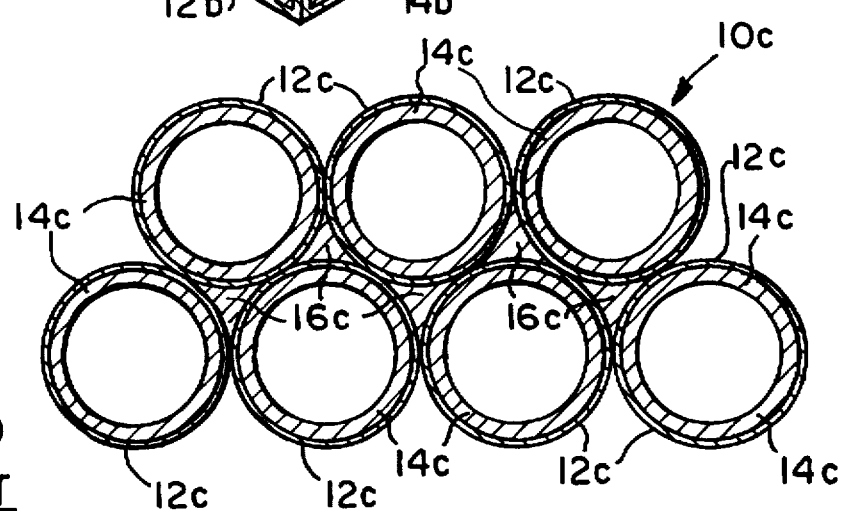
FIG. 3 is a cross-sectional view of a portion of a third core in accordance with the prior art.

The use of channels having a cross section which is generally in the form of a hexagon is advantageous over the prior art geometries. First, the theoretical available transfer surface area (i.e., based upon standard measurements and calculations of the geometries prior to coating the interactive material) of a hexagon is greater than the transfer surface area of a sinusoidal, triangle or square for a given volume. Second, the practical available transfer surface area (i.e., based upon standard measurements and calculations of the geometries after coating of the interactive material) of a hexagon is relatively greater, as compared to theoretical calculations, than the transfer surface area of a sinusoidal, triangle or square for a given volume because there are less surface area losses due to corner buildup. This results in the core 10 of the present invention achieving a number of transfer units which are equal to or greater than the number of transfer units the prior art cores achieve. Third, the pressure drop through the core 10 of the present invention is significantly less than the core constructed of the prior art geometries shown in FIGS. 1–3 because there is virtually no buildup in the corners of the generally hexagon shaped channels 14. Hence, the power necessary to force the fluid media through the core 10 is significantly less than that needed to force the fluid media through the prior art cores. For instance, in the case of desiccant air-conditioning systems, the reduction in power requirements allows the desiccant systems to operate at the same cost as conventional CFC air-conditioning systems for the same output of BTU's, without the inherent risk to the environment presented by CFC air-conditioning systems. Fourth, the hexagonal core 10 provides much better bonding between channels or cells compared to the wound corrugated process described above. Thus, the possibility for leakage of either fluid from one stream to the other at the sealing points is greatly reduced.

While in the present invention it is preferred that the channels 14 be configured to be generally in the form of a hexagon in cross section, it is understood by those skilled in the art that the cross section of the channels could be other straight-sided shapes with equal angles and equal side lengths, such that the cross section approaches a circle, and which permit the channels to be closely adjoined to maximize the greatest transfer surface area per unit volume without departing from the spirit and scope of the invention.

The method of making the core 10 comprises forming the plurality of adjoining channels 14 such that the channels 14 are generally in the form of a hexagon in cross section, as described above. As is also mentioned above, each of the channels 14 has a centrally disposed longitudinal axis 18. The internal surface area 16 of the channels 14 is then coated with the interactive material 20 which interacts with the fluid media flowing through the channels 14 to achieve one of the heat transfer, mass transfer, catalysis, ion exchange, separation of the fluid media, removal of organic compounds from the fluid media, dilution or concentration of fluid components, treatment of fluid-carried organisms, and the capture and retention of hazardous materials. The coating of the internal surface area 16 of the channels 14 with the interactive material 20 is accomplished by forced flow passing of the interactive material 20 through the channels 14 in a fluid phase at a laminar flow rate. The coating of surfaces using forced-flow passing is well understood by those of ordinary skill in the art and, therefore, further description thereof is omitted for purposes of convenience only. However, it is also understood by those skilled in the art that the interactive material 20 could be applied to the internal surface area 16 of the channels 14 in other manners. For instance, the interactive material 20 could be applied to the internal surface area 16 by deposition of a carrier fluid passed through the core 10 using a non-flooding technique, the interactive material 20 could be applied to the layers of material 12 prior to assembling the layers of material 12 into the generally hexagonal channels 14 or the interactive material could be incorporated in the material which makes up the layers of material 12.

Referring now to FIG. 4, there is shown a first rotary heat exchanger or mass transfer wheel 22 for changing the temperature of a fluid media passing therethrough or exchanging mass with a fluid media passing therethrough, respectively. The first wheel 22 includes a core 10, identical to that described above, which is in the form of a wheel having a predetermined diameter, circumference and width. The specific diameter, circumference and width are selected in accordance with the characteristics of the system in which the wheel 22 is to be installed, and are not pertinent to the present invention. To configure the core 10 in the form of a wheel, it is trimmed from a segment of core material which is larger than that of the wheel, using a cutting device, such as a knife or other cutting fixture (not shown). The manner in which the core 10 is trimmed or configured in the form of a wheel is not pertinent to the present invention, and is well understood by those of ordinary skill in the art. Accordingly, further description thereof is omitted.

While in the first preferred embodiment it is preferred that the core 10 be configured in the form of a wheel, it is understood by those skilled in the art that the core 10 is not limited to any particular configuration. That is, the core 10 can be formed in other geometrical configurations, such as generally annular, square, rectangular, triangular, elliptical or oval, without departing from the spirit and scope of the invention.

As best shown in FIG. 4, the first wheel 22 includes a hub assembly 24 at least partially disposed within the core 10. That is, the core 10 includes a centrally disposed bore 26 extending therethrough for receiving the hub assembly 24. It is preferred that the hub assembly 24 be positioned within the bore 26 with a slight interference fit to secure the hub assembly 24 within the bore 26. If desired, the hub assembly 24 could be additionally fastened to the core 10 by an adhesive, such as an epoxy. The hub assembly 24 is preferably constructed of a high-strength, lightweight material, such as aluminum. However, other materials could be used to construct the hub assembly 24, such as steel or a polymeric material, without departing from the spirit and scope of the invention.

As shown in FIG. 4, a semi-rigid rim 28 is secured about the circumference of the core 10. The rim 28 is also preferably constructed of a high-strength, lightweight material, such as aluminum. However, other materials could be used to construct the rim 28, such as steel or a polymeric material, without departing from the spirit and scope of the invention. The rim 28 is preferably formed from a flat piece of stock which is bent in the form of a circle and welded or mechanically fastened to itself. The core 10 is secured within the rim 28 due to an interference or friction fit. As with the hub assembly 24, the core 10 can be additionally secured to the rim 28 by the use of an adhesive, such as foaming epoxy.

A plurality of generally rigid spokes 30 are secured to the hub assembly 24 and extend radially outwardly through the layers of material 12 and the rim 28 for structurally strengthening the first wheel 22. That is, the hub assembly 24 includes a plurality of equidistantly spaced, threaded bores (not shown) about its circumference at both ends of the hub assembly. A corresponding plurality of radially extending tracks (not shown) are cut or grooved in both faces (only one is shown) of the core 10 for receiving one of the spokes 30. Each track extends between the threaded bore and a corresponding hole (not shown) in the rim 28. That is, one end of each spoke 30 is threaded and is passed through the hole in the rim 28, through the track and into threaded engagement with the threaded bore in the hub assembly 24. The other end of each spoke 30 is enlarged (not shown), such as by attaching a bolt head or nut to the end of the spoke 30, to prevent the spoke 30 from passing through the hole in the rim 28 and to allow the spoke 30 to be easily attached to the bore of the hub assembly 24 by the use of a conventional tool, such as a wrench (not shown). This process is carried out on both sides of the first wheel 22 such that the spokes 30 are disposed on both sides of the core 10.

The assembly of the first wheel 22 is well understood by those skilled in the art (see, for example, U.S. Pat. Nos. 4,093,435 and 4,255,171) and, therefore, the foregoing description of the assembly is brief for purposes of convenience only and is not limiting. Thus, it will be appreciated by those skilled in the art from this disclosure that the present invention is not limited to any particular method of assembling the first wheel 22 or the specific structure of the first wheel 22 shown in FIG. 4.

In use the first wheel 22 is rotated by a rotatably driven shaft (not shown) fixed to the hub assembly 24. The use of the first wheel 22 and the manner in which it is rotatably driven is well understood by those of ordinary skill in the art and, therefore, further description thereof is omitted for purposes of convenience only and is not limiting.

Referring now to FIGS. 6 through 8, there is shown a second preferred embodiment of a rotary wheel 32 having a core 10 disposed therein. In the second embodiment, the core 10 is generally identical to the core 10 described above in connection with FIGS. 4 and 5. However, the second wheel 32 is different from the first wheel 22 in that the hub assembly 24 and spokes 30 are omitted. That is, the layers of material 12 which form the channels 14 of the core 10 provide the core 10 with sufficient structural integrity to avoid the requirement of a hub assembly and spokes.

In the second wheel 32, the rim 34 is generally identical to the rim 28 described above in connection with the first wheel 22, except that a radially outwardly extending track 36 is provided on the external surface of the rim 34. The track 36 allows the second wheel 32 to be supported at its periphery, as opposed to the center, as described above in connection with FIG. 4.

As shown in FIG. 6, the second wheel 32 is rotatably mounted within a housing 38. The housing 38 is generally in the form of a parallelepiped and includes a pair of semicircular openings 40 on each side to allow the second wheel 32 to be placed in a desiccant air-conditioning system of the type described in U.S. Pat. No. 4,594,860. A plurality of support wheels 42 are disposed within the housing 38 and are in rolling engagement with the track 36. The support wheels 42 are positioned to rotatably support the second wheel 32 in the housing 38 such that the core 10 of the second wheel 32 is in alignment or registry with the semicircular openings 40. As shown in FIG. 8, the support wheels 42 are supported within the housing 38 by a generally T-shaped support member 44 which permits the support wheel 42 to rotate with respect to the support member 44 in a manner well understood by those of ordinary skill in the art. The particular manner in which the support wheels 42 are supported within the housing 38 is not pertinent to the present invention. A drive mechanism (not shown) is disposed within the housing 38 and drivingly engages the exterior of the rim 34 to rotate the second wheel 32 with respect to the housing 38.

The components of the housing 38 are preferably constructed of a high-strength, lightweight material, such as aluminum. However, it is understood by those skilled in the art that the housing 38 could be constructed of other materials, such as a polymeric material or stainless steel, without departing from the spirit and scope of the invention.

The details of the mounting and driving of the second wheel 32 in accordance with the second preferred embodiment, within the housing 38 are not pertinent to the present invention. It is recognized by those of ordinary skill in the art from this disclosure that the second wheel 32 can be mounted in any manner without departing from the spirit and scope of the invention. Accordingly, further description thereof is omitted for purposes of convenience only, and is not limiting.

It is apparent from the foregoing description of the core 10 that the use of the core 10 is not limited to any particular application. That is, the core 10 can be coated with a number of different interactive materials which interact with the fluid media flowing through the channels to achieve several different results, including, but not limited to, heat transfer, mass transfer, catalysis, ion exchange, separation of the fluid media, removal of volatile organic compounds from the fluid media, dilution or concentration of fluid components, treatment of fluid-carried organisms, and the capture and retention of hazardous materials. Accordingly, one of ordinary skill in the art from this disclosure understands that the present invention is not limited to the use of heat and mass transfer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A core for interacting with a fluid media flowing therethrough comprising a plurality of adjoining channels, said channels being hexagonal in cross section and including an internal surface area comprising six walls, four of said six walls of each channel being formed from a single layer of material and two of said six walls being formed from two layers of material, said internal surface area being surface coated with an interactive material which interacts with the fluid media flowing through said channels.

2. The core as recited in claim 1 wherein the coating of interactive material interacts with the fluid media flowing through said channels to achieve one of heat transfer, mass transfer, ion exchange, separation of fluid media, removal of organic compounds from fluid media, dilution or concentration of fluid components of the fluid media, treatment of organisms carried in the fluid media and the capture and retention of selected materials from the fluid media.

3. The core as recited in claim 1 wherein the coating of interactive material interacts with the fluid media flowing through said channels to achieve mass transfer.

4. The core as recited in claim 1 wherein the channels are formed from a plurality of layers of sheet material.

5. The core as recited in claim 4 wherein the sheet material is selected from one of the group consisting of an aramid in paper form, kraft paper, nylon fiber paper, and mineral fiber paper.

6. The core as recited in claim 1 wherein the interactive material is a desiccant material.

7. The core of claim 6 wherein the hexagonal channels each have a longitudinal axis, and the distance between the longitudinal axes of adjacent hexagonal channels is less than about 0.125 inches.

8. The core of claim 7 wherein each layer of material has a thickness of less than about 0.006 inches.

9. The core as recited in claim 1 wherein the interactive material is a crystalline titanium silicate molecular sieve zeolite.

10. A core for interacting with a fluid media flowing therethrough comprising a plurality of adjoining channels, said channels being hexagonal in cross section and including an internal surface area comprising six walls, four of said six walls of each channel being formed from a single layer of material and two of said six walls being formed from two layers of material, said internal surface area being surface coated with a sorbent material for mass transfer from the fluid media flowing through said channels.

11. The core of claim 10 wherein the sorbent material is a desiccant material.

12. The core of claim 11 wherein the hexagonal channels each have a longitudinal axis, and the distance between the longitudinal axes of adjacent hexagonal channels is less than about 0.125 inches.

13. The core of claim 12 wherein each layer of material has a thickness of less than about 0.006 inches.

* * * * *